(12) United States Patent
Tanaka

(10) Patent No.: US 6,642,951 B2
(45) Date of Patent: Nov. 4, 2003

(54) OPTICAL SCANNING DEVICE USED IN A TANDEM SYSTEM COLOR IMAGE FORMING APPARATUS

(75) Inventor: Toshihito Tanaka, Saga (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/956,600

(22) Filed: Sep. 20, 2001

(65) Prior Publication Data
US 2002/0036690 A1 Mar. 28, 2002

(30) Foreign Application Priority Data
Sep. 22, 2000 (JP) .......................... 2000-288358

(51) Int. Cl.[7] .............................. B41J 27/00
(52) U.S. Cl. ....................... 347/241; 347/256
(58) Field of Search ................... 347/241, 242, 347/244, 256, 257, 258, 259, 243; 359/204

(56) References Cited

U.S. PATENT DOCUMENTS 6,061,079 A * 5/2000 Ota et al. ............... 347/243
6,317,245 B1 * 11/2001 Hama et al. ............. 359/204
6,337,757 B1 * 1/2002 Shiraishi et al. .......... 359/204

FOREIGN PATENT DOCUMENTS

JP 63-264358 * 11/1988 ............. B41J/3/04

* cited by examiner

Primary Examiner—Hai Pham
(74) Attorney, Agent, or Firm—McDermott, Will & Emery

(57) ABSTRACT

The optical scanning device includes a deflector 22 for deflecting plural laser beams in batch, first and second fθ lenses 24, 25 for converting the laser beams from the deflector 22 into uniform speed linear motion, reflection mirrors 23a to 23g for reflecting the laser beams from the first and second fθ lenses 24, 25, photoreceptor drums 2a, 2b, 2c, 2d on which latent images are formed by laser beams, and third fθ lenses 26a to 26d for focusing the laser beams reflected by the reflection mirrors 23a to 23g and guiding onto the photoreceptor drums 2a, 2b, 2c, 2d. The laser beam 9a reflected by the reflection mirror 23 remotest from the deflector 23 is the laser beam for forming a yellow image.

10 Claims, 5 Drawing Sheets

OPTICAL SCANNING DEVICE USED IN A TANDEM SYSTEM COLOR IMAGE FORMING APPARATUS

BACKGROUND OF THE INVENTION

1. Field of the Invention

The present invention relates to an optical scanning device used in a tandem system color image forming apparatus such as color copier, color printer and color facsimile apparatus.

2. Description of the Related Art

Recently, the tandem system color image forming apparatus is used in order to upgrade the forming speed of color images substantially. In this color image forming apparatus, four photoreceptor drums are arranged in a row along the conveying direction of the printing paper. The photoreceptor drums are uniformly charged by a charging unit, and the photoreceptors are simultaneously exposed to laser beams, and four electrostatic latent images are formed. The four electrostatic latent images are developed by yellow, magenta, cyan, and black toners in a developing unit, and are sequentially overlaid and transcribed, and a color image is formed. This color image forming apparatus is widely used in digital copiers and laser printers.

Such tandem system color image forming apparatus generally comprises, as shown in FIG. 5, optical scanning devices 6a, 6b, 6c, 6d, photoreceptor drums 2a, 2b, 2c, 2d, and developing units respectively corresponding to yellow, magenta, cyan, and black colors. The optical scanning devices 6a, 6b, 6c, 6d are composed of deflectors 22a, 22b, 22c, 22d, first fθ lenses 24a, 24b, 24c, 24d and second fθ lenses 25a, 25b, 25c, 25d for composing converting optical units, reflection mirrors 23a, 23b, 23c, 23d, and focusing optical units 26a, 26b, 26c, 26d.

On the other hand, a four-pass system color image forming apparatus transcribes yellow, magenta, cyan, and black colors to intermediate transcribing elements one by one, and transcribes on the printing paper in batch. That is, the four-pass system color image forming apparatus is composed of four developing devices, one optical scanning device, and one photoreceptor drum. Accordingly, the four-pass system color image forming apparatus is smaller in size, but slower in printing speed.

By contrast, the tandem system requires a greater number of optical scanning devices and photoreceptor drums than in the four-pass system, and the entire apparatus is larger in size and higher in cost.

To solve these problems, it has been attempted to integrate the optical scanning device so as to reduce size and cost while maintaining the features of high speed printing of the tandem system.

Above all, it has been proposed to reduce the number of deflectors, that is, polygon motors which are most expensive among components of the optical scanning device, from four pieces to one or two. This is a technology of emitting plural laser beams to one polygon mirror surface. For example, plural laser beams are synthesized by composite members of prism and half-mirror, and emitted to a same position on the polygon mirror, or without being synthesized, parallel or alternate beams are emitted to the polygon mirror surface. Or, to decrease the number of optical lenses, four laser beams are designed to pass the same optical lens.

These technologies contribute to reduction of size and cost of the optical scanning device, but lead to other problems such as ghost printing or color overlaying defect due to defective space separation of laser beams of the optical scanning device.

In the system of synthesizing four laser beams, or arraying in parallel beams to pass through a same lens, if the space separation of laser beams after passing through the lens is defective, for example, if the laser beam for printing yellow mixes into cyan for next printing to print cyan color in blank area or printed area of the printing paper, this problem occurs.

Such color overlaying defect, in particular, ghost printing is a serious problem in the case of a printer in which more accurate and clean printing is required than in a copier.

SUMMARY OF THE INVENTION

It is hence an object of the invention to present an integrated optical scanning device capable of preventing color overlaying defect of image formed by plural emitted laser beams.

An optical scanning device of the invention comprises:

a deflector for deflecting in batch a plurality of laser beams entered as being arrayed in a vertical direction to the plane of deflection;

a converting optical unit for converting equiangular speed motion of the plurality of laser beams deflected by the deflector in batch into uniform speed linear motion;

a plurality of reflection mirrors for reflecting the plurality of laser beams converted by the converting optical unit;

a plurality of focusing optical units for focusing the plural laser beams reflected by the plurality of reflection mirrors; and a plurality of photoreceptors for forming an electrostatic latent image by the plurality of laser beams focused by the plurality of focusing optical units, each of the plurality of photoreceptors being arranged in a sub scanning direction to each of the plurality of laser beams from the plurality of focusing optical units, wherein a yellow image is formed by a laser beam reflected by a remotest reflection mirror from said deflector, among said plurality of reflection mirrors.

In this configuration, if light of defective space separation component of other laser beam mixes into the laser beam for forming the yellow image, since yellow is the least obvious color, color overlaying defect of image can be prevented, and an image of high quality is obtained.

DESCRIPTION OF THE PREFERRED EMBODIMENTS

Figure 1:
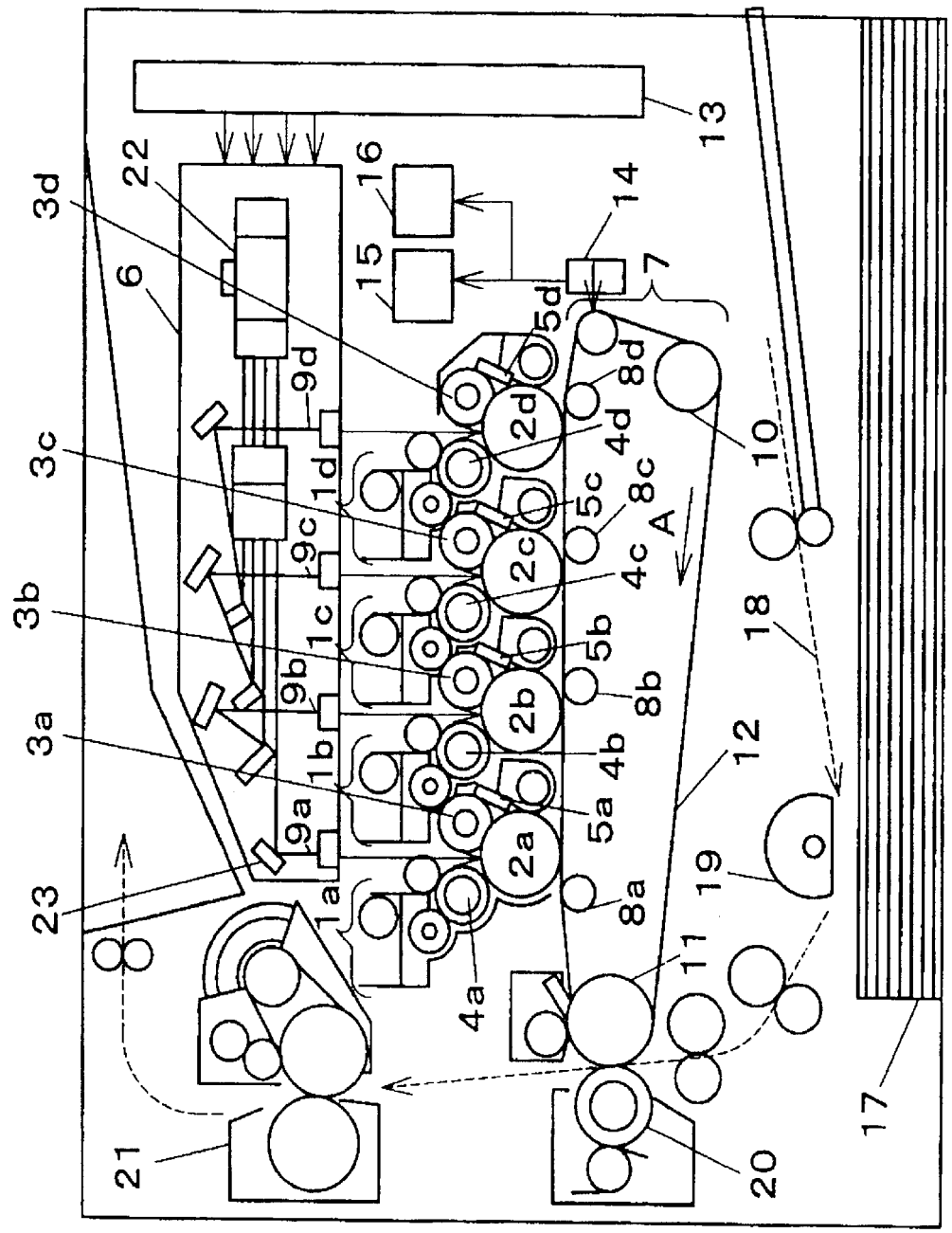
FIG. 1 shows a color image forming apparatus in an embodiment of the invention.

Preferred embodiments of the invention are described below while referring to FIG. 1 to FIG. 4. In these drawings, including FIG. 5, the same members are identified with same reference numerals, and duplicate explanation is omitted.

Figure 2:
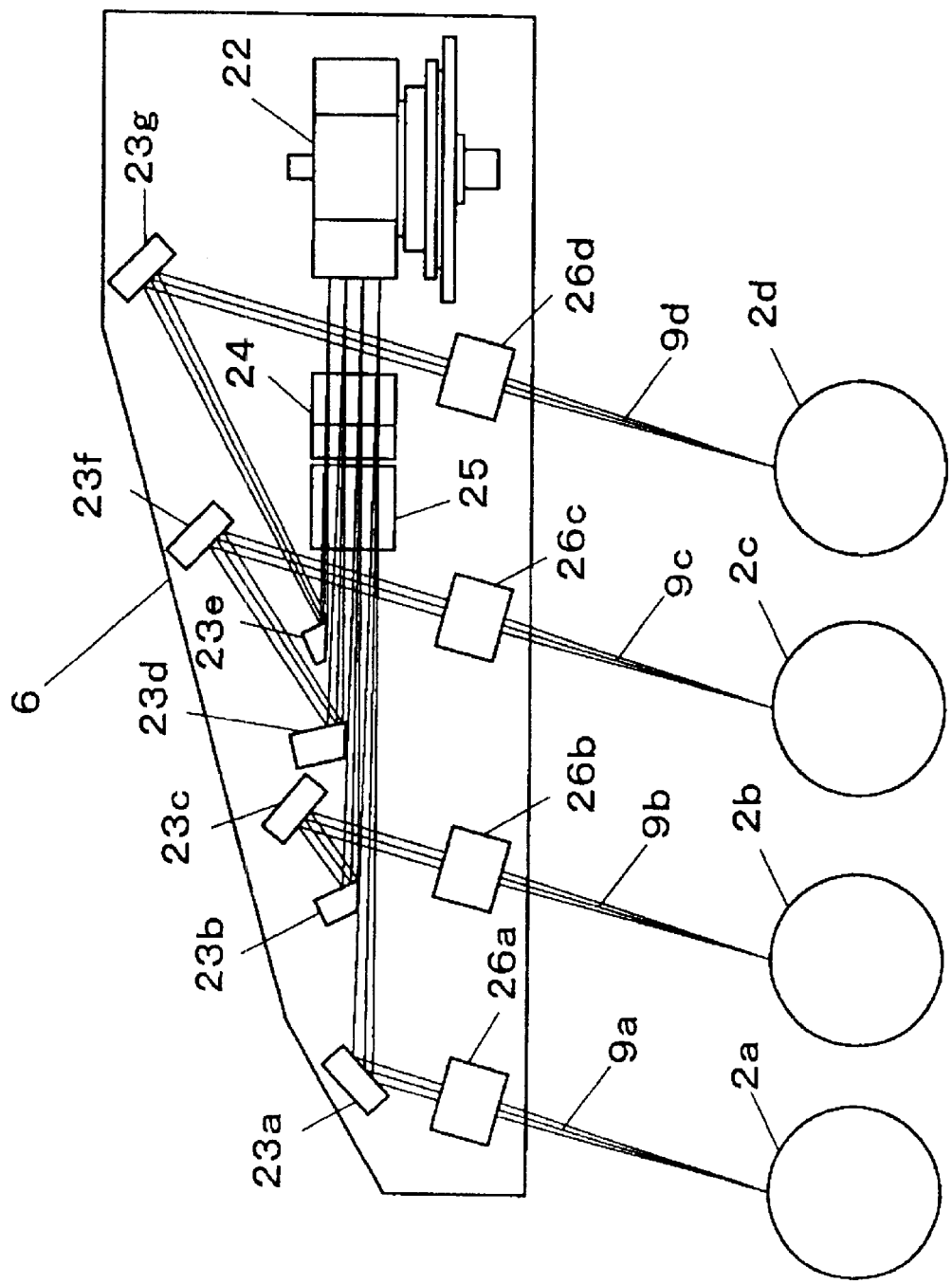
FIG. 2 shows an optical scanning device in an embodiment of the invention installed in the color image forming apparatus in FIG. 1.
Figure 3:
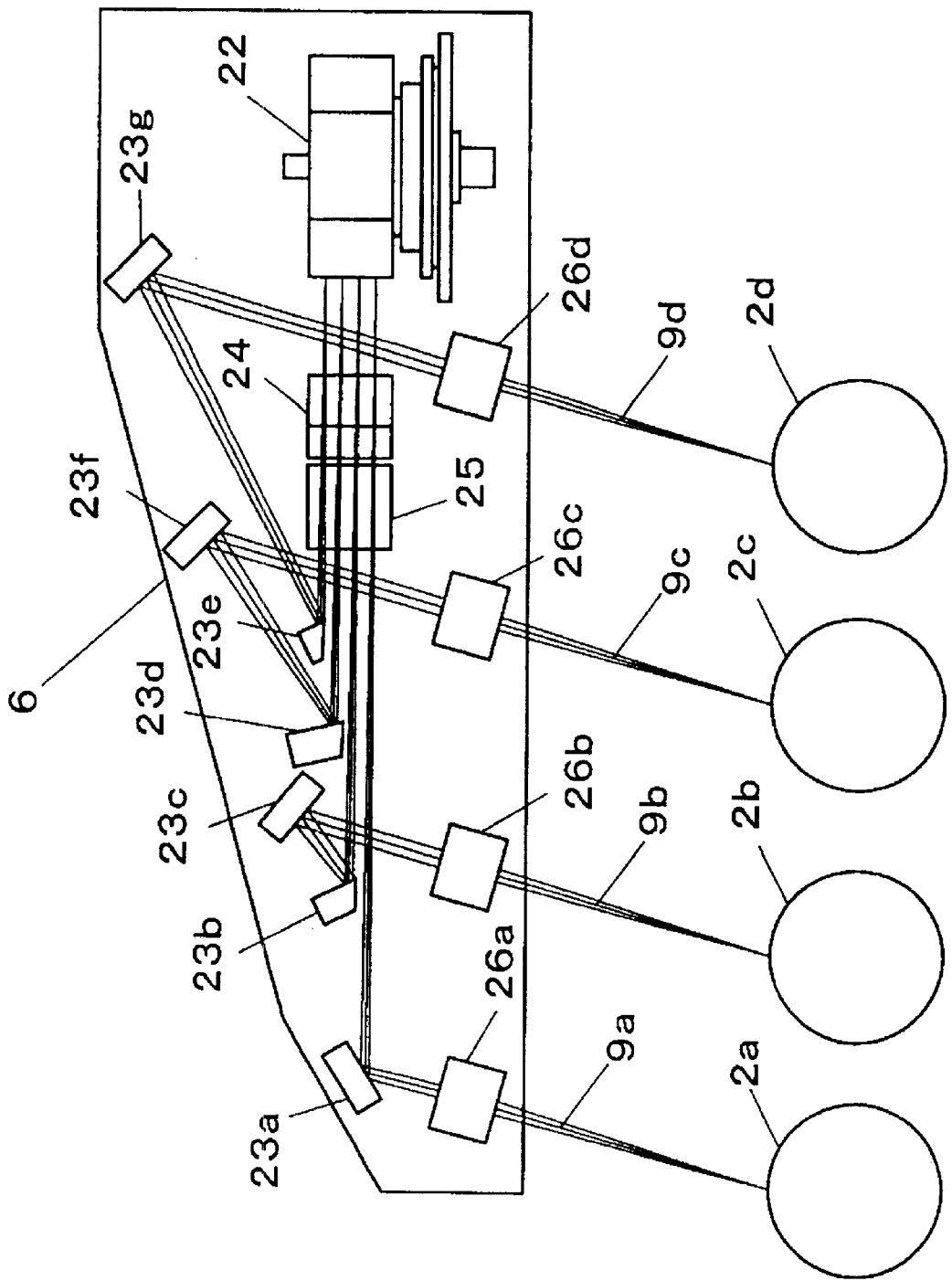
FIG. 3 shows an optical scanning device in other embodiment of the invention installed in the color image forming apparatus in FIG. 1.
Figure 4:
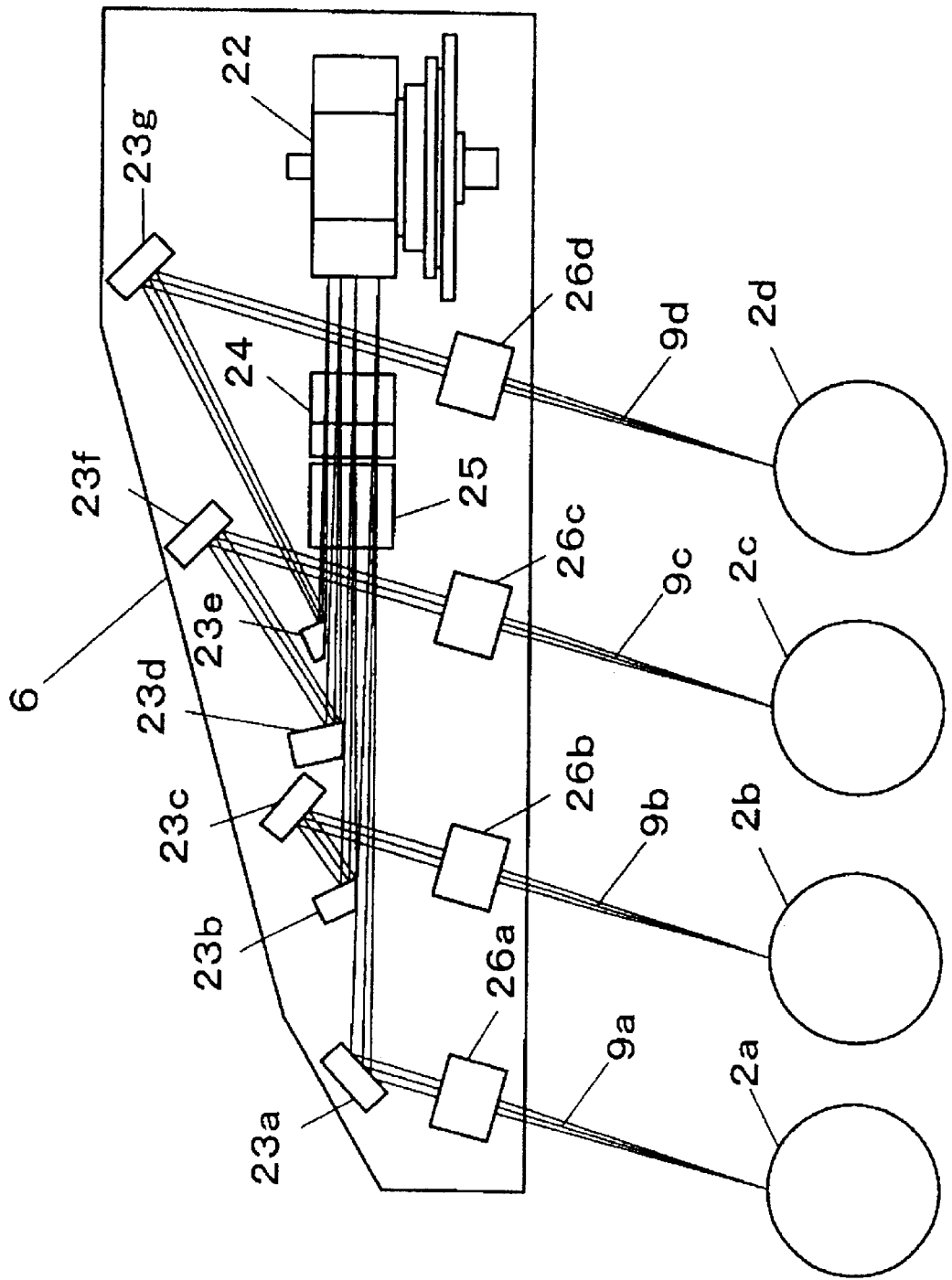
FIG. 4 shows an optical scanning device in a different embodiment of the invention installed in the color image forming apparatus in FIG. 1.
Figure 5:
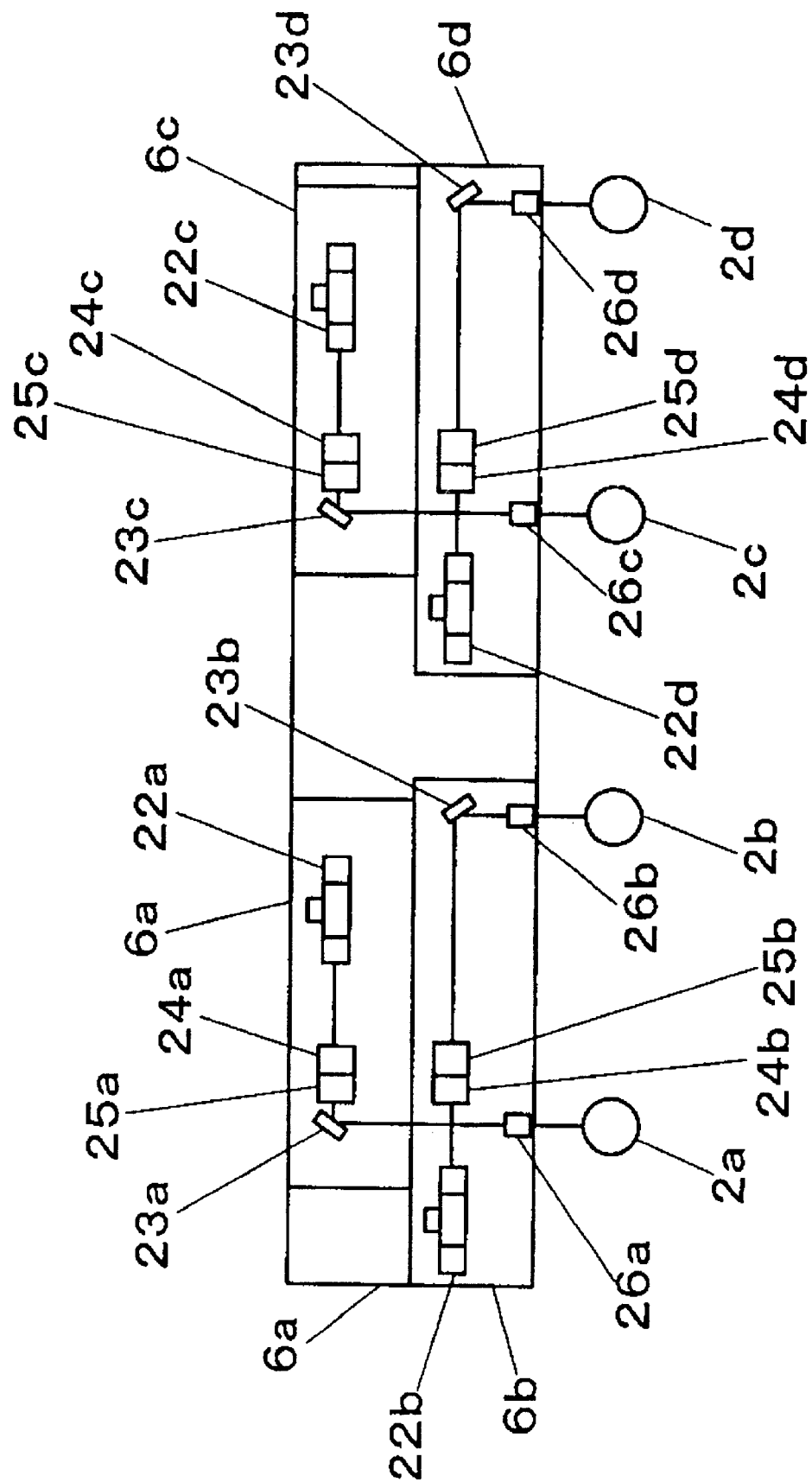
FIG. 5 shows an example of a conventional optical scanning device.

FIG. 1 is an explanatory diagram showing a color image forming apparatus in an embodiment of the invention, FIG. 2 is an explanatory diagram showing an optical scanning device in an embodiment of the invention installed in the color image forming apparatus in FIG. 1, FIG. 3 is an explanatory diagram showing an optical scanning device in other embodiment of the invention installed in the color image forming apparatus in FIG. 1, and FIG. 4 is an explanatory diagram showing an optical scanning device in a different embodiment of the invention installed in the color image forming apparatus in FIG. 1.

As shown in FIG. 1, the tandem system color image forming apparatus of the embodiment has four image forming stations 1a, 1b, 1c, 1d. These image forming stations 1a, 1b, 1c, 1d have photoreceptor drums (photoreceptors) 2a, 2b, 2c, 2d as image carriers.

Around the photoreceptor drums (photoreceptors) 2a, 2b, 2c, 2d, the following members are arranged:

charging means 3a, 3b, 3c, 3d for uniformly charging the surface of the photoreceptor drums 2a, 2b, 2c, 2d;

developing means 4a, 4b, 4c, 4d for making the electrostatic latent images sensible;

cleaning means 5a, 5b, 5c, 5d for removing residual toners;

an optical scanning device 6 as exposure means for emitting the light corresponding to the image information to the photoreceptor drums 2a, 2b, 2c, 2d; and transcribing units 8a, 8b, 8c, 8d for transcribing the toner image to an intermediate transcribing belt (image carrier) 12 for composing transcribing means 7.

In the image forming stations 1a, 1b, 1c, 1d, respectively, yellow image, magenta image, cyan image, and black image are formed. The optical scanning device 6 emits laser beams 9a, 9b, 9c, 9d for forming yellow image, magenta image, cyan image, and black image.

In a manner of passing through the image forming stations 1a, 1b, 1c, 1d, an endless intermediate transcribing belt 12 supported by rollers 10, 11 is disposed beneath the photoreceptor drums 2a, 2b, 2c, 2d, and it turns in the arrow "A" direction.

Opposite to the intermediate transcribing belt 12, toner density detecting means 14 is disposed for detecting the toner density of the test pattern from test pattern generating means 13. The structure further includes exposure intensity correcting means 15 for correcting the exposure power of each color on the basis of the detection result from the toner density detecting means 14, and development bias correcting means 16 for correcting the development bias value of each color on the basis of the detection result from the toner density detecting means 14. The optical scanning device 6 produces laser beams corrected of exposure intensity by the correction value from the exposure intensity correcting means 15. The developing means 4a, 4b, 4c, 4d apply development bias by the correction value from the development bias correcting means 16.

Sheets 18 stocked in a paper cassette 17 are supplied by a paper feed roller 19, and discharged into a delivery tray (not shown) by way of a sheet transcribing roller 20 and fixing means 21.

In the color image forming apparatus having such configuration, first at the image forming station 1d, a latent image of black color of the image data is formed on the photoreceptor drum 2d by known electrophotographic process means using the charging means 3d, optical scanning device 6, and others. Then, by the developing means 4d, a visible black toner image is formed by a developing material containing black toner, and a black toner image is transcribed on the intermediate transcribing belt 12 by the transcribing unit 8d.

While the black toner image is being transcribed on the intermediate transcribing belt 12, a latent image of cyan color is formed at the image forming station 1c. Then, by the developing means 4c, a visible cyan toner image is formed by cyan toner, and is overlaid on the black toner image transcribed on the intermediate transcribing belt 12 by the transcribing unit 8c.

Similarly, thereafter, magenta toner image and yellow toner image are formed. When four color toner images are overlaid on the intermediate transcribing belt 12, the four color toner images are transcribed in batch on the sheet 18 supplied from the paper cassette 17 by the paper feed roller 19 by means of the sheet transcribing roller 20, and the sheet is conveyed. After heating and fixing by the fixing means 21, a full color image is formed on the sheet 18.

After the transcribing process, the photoreceptor drums 2a, 2b, 2c, 2d are cleaned by the cleaning means 5a, 5b, 5c, 5d, and the residual toners are removed so as to be ready for next image forming process, and the printing operation is over.

The optical scanning device 6 of the color image forming apparatus having such configuration has a single deflector 22 for deflecting and scanning in batch plural laser beams (four laser beams corresponding to four colors of development in this embodiment) 9a, 9b, 9c, 9d entering at equal intervals as being arrayed in a vertical direction to the plane of deflection as shown in FIG. 2 to FIG. 4.

On the light path of laser beams ranging from the deflector 22 to photoreceptor drums 2a, 2b, 2c, 2d arranged at equal intervals in the sub scanning direction, the following optical members are disposed:

first and second fθ lenses (converting optical unit) 24, 25 as a single optical system for converting laser beams 9a, 9b, 9c, 9d of equiangular speed motion into laser beams of uniform speed linear motion of equal intervals and parallel layout;

reflection mirrors 23a, 23b, 23c, 23d for reflecting laser beams produced from the second fθ lens; and third fθ lenses (focusing optical units) 26a, 26b, 26c, 26d as an optical unit for focusing the laser beams reflected by the reflection mirrors 23a, 23b, 23c, 23d to form images on photoreceptor drums 2a, 2b, 2c, 2d.

These members are contained in a single housing.

In the color image forming apparatus shown in FIG. 2, the laser beams 9a, 9b, 9c, 9d deflected by the deflector 22 pass through the first fθ lens 24, second fθ lens 25, and third fθ lenses 26a, 26b, 26c, 26d, and images are formed on the photoreceptor drums 2a, 2b, 2c, 2d.

At this time, the laser beams 9a, 9b, 9c, 9d are individually separated in space by the reflection mirrors 23b, 23d, 23e disposed between the second fθ lens 25 and third fθ lenses 26a, 26b, 26c, 26d. As shown in the diagram, the laser beams 9a, 9b, 9c, 9d deflected from the deflector for correction of tilt of the mirror surface of the deflector 22 are gradually expanded in the beam diameter. Being focused by the third fθ lenses 26a to 26d, images are formed on the photoreceptor drums 2a, 2b, 2c, 2d.

In such color image forming apparatus, since the beam diameter near the reflection mirror 23b for space separation is larger than in the vicinity of the reflection mirrors 23d, 23e, accurate space separation is difficult.

Accordingly, in this embodiment, developing means is disposed so as to form a yellow image by the laser beam 9a reflected by the remotest reflection mirror 23a from the deflector 22. As a result, if light of space separation defective portion of laser beams 9b to 9d for forming other color images than yellow, especially the laser beam 9b positioned next to the laser beam 9a for forming the yellow image should mix into the image of the laser beam 9a, since this is the least obvious yellow color, image color overlaying defect is prevented, and an image of high quality is obtained.

In the configuration in FIG. 2, if the space separation of the laser beam 9b is improper, the light of this component mixes into the remotest laser beam 9a from the deflector 22.

In the optical scanning device in FIG. 3, the focusing beam diameter on the photoreceptor drum 2a is large so that the laser beam 9b may not be large in diameter near the reflection mirror 23b. In this configuration, the adjacent laser beam 9b does not mix into the laser beam 9a.

It makes use of the property when focusing the laser beam by the lens, that is, the beam diameter φd on the image forming plane is inversely proportional to the beam diameter φD at the time of incidence on the lens.

$$\phi/d = k \cdot (f/\phi D)$$

(where k: constant, f: focal length of lens)
More specifically, when the focusing beam diameter on the photoreceptor drum 2a is large, the beam diameter entering the third fθ lens 26a is smaller, and the allowance for space separation is increased. It is more effective when the laser beam 9a is the least obvious yellow color. For example, supposing the resolution of the color image forming apparatus to be 600 dpi (600 dots per inch), when the ordinary beam diameter on the image forming plane of the photoreceptor drum in the sub scanning direction is 75 to 80 μm, only by expanding the laser beam 9a to 90 to 100 μm, the beam diameter entering the third fθ lens 26a is decreased by 20%. That is, in the case of an incident beam diameter of 2 mm, the allowance for space separation is increased by 0.4 mm.

In the optical scanning device shown in FIG. 4, the interval of the plural laser beams 9a, 9b, 9c, 9d emitted from the deflector 22 is an uneven pitch, and the interval ratio is set corresponding to the layout distance ratio of the reflection mirrors 23a, 23b, 23c, 23d.

When the laser beam near the deflector 22 is separated spatially, the beam diameter is sufficiently small herein, and the allowance for space separation is large. By making use of this feature, the interval of the laser beams separated near the deflector 22 is shortened, whereas the laser beam interval is widened at the remoter side where the allowance for space separation is small.

To reduce the costs of the polygon mirror used in the deflector 22, it is necessary to minimize the thickness in the motor axial direction. However, when the laser beams 9a, 9b, 9c, 9d enter parallel and at equal intervals, considering the space separation, the beam diameter for space separation must be adjusted to the one at the remotest side from the deflector 22 where separation is most difficult. Accordingly, the interval of the incident laser beams 9a, 9b, 9c, 9d is set at uneven pitches.

Supposing the distances from the deflector 22 to the reflection mirrors 23e, 23d, 23b to be M1, M2, M3, respectively, and the distance between laser beam 9a and laser beam 9b, between laser beam 9b and laser beam 9c, and between laser beam 9c and laser beam 9d to be L1, L2, L3, respectively, by arranging in the relation of $$M1:M2:M3 = L1:L2:L3,$$

the allowance for space separation can be enhanced, and the cost of the polygon mirror of the deflector can be lowered at the same time.

Thus, according to the invention, in the laser beam for forming a yellow image, if light of other laser beam defective portion in space separation should mix, since this is the least obvious yellow color, color overlaying defect of image can be prevented, and a beneficial effect is obtained.

When the beam diameter of the laser beam emitted to the photoreceptor at the remotest position from the deflector is set larger than the beam diameter of other laser beams, the beam diameter entering the focusing optical unit can be reduced, so that the allowance for space separation is enhanced.

By setting the interval of the plural laser beams emitted from the deflector at uneven pitches, and setting the interval ratio corresponding to the layout distance ratio of reflection mirrors, only by contracting the interval of laser beams separated near the deflector and widening the interval of laser beams separated at remote distance, the allowance for space separation can be increased.

What is claimed is:

1. An optical scanning device comprising:
   a deflector for deflecting in batch a plurality of laser beams entered as being arrayed in a vertical direction to the plane of deflection;
   a converting optical unit for converting equiangular speed motion of the plurality of laser beams deflected by the deflector in batch into uniform speed linear motion;
   a plurality of reflection mirrors for reflecting the plurality of laser beams converted by said converting optical unit;
   a plurality of focusing optical units for focusing the plural laser beams reflected by said plurality of reflection mirrors; and
   a plurality of photoreceptors for forming an electrostatic latent image by the plurality of laser beams focused by said plurality of focusing optical units, each of said plurality of photoreceptors being arranged in a sub scanning direction to each of the plurality of laser beams from said plurality of focusing optical units,
   wherein interval of the plurality of laser beams deflected from said deflector is an uneven pitch, and interval ratio corresponds to layout distance ratio of said plurality of reflection mirrors.

2. The optical scanning device of claim 1,
   wherein said plurality photoreceptors are arranged at equal intervals in the sub scanning direction.

3. The optical scanning device of claim 1,
   wherein beam diameter of a laser beam emitted to a photoreceptor at the remotest position from said deflector is larger than beam diameter of other laser beams, of the plurality of laser beams focused by said plurality of focusing optical units.

4. The optical scanning device of claim 1,
   wherein the plurality of laser beams deflected from said deflector are first laser beam, second laser beam, third laser beam, and fourth laser beam,
   an interval (L1) of the first laser beam and the second laser beam is longer than an interval (L2) of the second laser beam and the third laser beam, and the interval L2 is longer than an interval (L3) of the third laser beam and the fourth laser beam, said plurality of reflection mirrors include at least a first reflection mirror for reflecting the first laser beam, a second reflection mirror for reflecting the second laser beam, a third reflection mirror for reflecting the third laser beam, and a fourth reflection mirror for reflecting the fourth laser beam, and the ratio (M1:M2:M3) of the distances M1, M2, and M3 of said fourth reflection mirror, said third reflection mirror and said second reflection mirror from said deflector is equal to the ratio (L3:L2:L1) of the intervals L1, L2, and L3.

5. The optical scanning device of claim 4, wherein beam diameter of a laser beam emitted to a photoreceptor at the remotest position from said deflector is larger than beam diameter of other laser beams, of the plurality of laser beams focused by said plurality of focusing optical units.

6. The optical scanning device of claim 1, wherein a yellow image is formed by a laser beam reflected by a remotest reflection mirror from said deflector, among said plurality of reflection mirrors.

7. An optical scanning device comprising:

a deflector for deflecting in batch a plurality of laser beams entered as being arrayed in a vertical direction to the plane of deflection;

a converting optical unit for converting equiangular speed motion of the plurality of laser beams deflected by the deflector in batch into uniform speed linear motion;

a plurality of reflection mirrors for reflecting the plurality of laser beams converted by said converting optical unit;

a plurality of focusing optical units for focusing the plural laser beams reflected by said plurality of reflection mirrors; and a plurality of photoreceptors for forming an electrostatic latent image by the plurality of laser beams focused by said plurality of focusing optical units, each of said plurality of photoreceptors being arranged in a sub scanning direction to each of the plurality of laser beams from said plurality of focusing optical units, wherein a yellow image is formed by a laser beam reflected by a remotest reflection mirror from said deflector, among said plurality of reflection mirrors, wherein beam diameter of a laser beam emitted to a photoreceptor at the remotest position from said deflector is larger than beam diameter of other laser beams, of the plurality of laser beams focused by said plurality of focusing optical units.

8. The optical scanning device of claim 7, wherein said plurality photoreceptors are arranged at equal intervals in the sub scanning direction.

9. The optical scanning device of claim 7, wherein interval of the plurality of laser beams deflected from said deflector is an uneven pitch, and interval ratio corresponds to layout distance ratio of said plurality of reflection mirrors.

10. The optical scanning device of claim 7, wherein the plurality of laser beams deflected from said deflector are first laser beam, second laser beam, third laser beam, and fourth laser beam, an interval (L1) of the first laser beam and the second laser beam is longer than an interval (L2) of the second laser beam and the third laser beam, and the interval L2 is longer than an interval (L3) of the third laser beam and the fourth laser beam, said plurality of reflection mirrors include at least a first reflection mirror for reflecting the first laser beam, a second reflection mirror for reflecting the second laser beam, a third reflection mirror for reflecting the third laser beam, and a fourth reflection mirror for reflecting the fourth laser beam, and the ratio (M1:M2:M3) of the distances M1, M2, and M3 of said fourth reflection mirror, said third reflection mirror and said second reflection mirror from said deflector is equal to the ratio (L3:L2:L1) of the intervals L1, L2, and L3.

* * * * *